US009313686B2

(12) United States Patent
Johansson

(10) Patent No.: US 9,313,686 B2
(45) Date of Patent: Apr. 12, 2016

(54) MANAGING COMMUNICATIONS WITHIN A WIRELESS COMMUNICATIONS NETWORK

(75) Inventor: Ingemar Johansson, Lulea (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 39 days.

(21) Appl. No.: 14/128,579

(22) PCT Filed: Jun. 21, 2011

(86) PCT No.: PCT/EP2011/060361
§ 371 (c)(1),
(2), (4) Date: Dec. 20, 2013

(87) PCT Pub. No.: WO2012/175117
PCT Pub. Date: Dec. 27, 2012

(65) Prior Publication Data
US 2014/0133296 A1 May 15, 2014

(51) Int. Cl.
H04L 12/26 (2006.01)
H04W 28/02 (2009.01)
H04W 72/12 (2009.01)

(52) U.S. Cl.
CPC ...... *H04W 28/0289* (2013.01); *H04W 72/1247* (2013.01); *H04W 72/1252* (2013.01)

(58) Field of Classification Search
CPC ............ H04W 28/0289; H04W 28/02; H04W 28/0273; H04W 28/0284; H04W 72/1252; H04W 72/1247; H04L 47/00; H04L 47/10; H04L 47/12; H04L 47/14; H04L 47/24; H04L 47/626
See application file for complete search history.

(56) References Cited

U.S. PATENT DOCUMENTS

| 8,064,382 | B2* | 11/2011 | Zisimopoulos ... H04W 72/1268 370/322 |
| 8,600,397 | B2* | 12/2013 | Ishii et al. ...................... 455/453 |
| 8,724,467 | B2* | 5/2014 | Le Faucheur ........... H04L 47/11 370/235 |
| 2006/0159016 | A1* | 7/2006 | Sagfors et al. ................ 370/230 |
| 2007/0225015 | A1 | 9/2007 | Mueckenheim et al. |
| 2009/0268684 | A1* | 10/2009 | Lott .................... H04W 72/087 370/329 |
| 2011/0044262 | A1 | 2/2011 | Satapathy et al. |
| 2012/0051216 | A1* | 3/2012 | Zhang ..................... H04L 47/12 370/230 |

FOREIGN PATENT DOCUMENTS

EP 2 028 798 A1 2/2009
WO 2010056158 A1 5/2010

OTHER PUBLICATIONS

Conex Status Pages, printed from http://tools.ietf.org/wg/conex/charters, 2014, 2 pages.

(Continued)

*Primary Examiner* — Anh Ngoc Nguyen
(74) *Attorney, Agent, or Firm* — Rothwell, Figg, Ernst & Manbeck, P.C.

(57) ABSTRACT

A wireless communications network for communicating with wireless communications devices, the wireless communications network comprising a processor arranged to: measure congestion for each wireless communication link between a plurality of the wireless communications devices and the wireless communications network; and prioritize scheduling of communications with the plurality of wireless communications devices dependent upon the measured congestion.

11 Claims, 5 Drawing Sheets

(56) References Cited

OTHER PUBLICATIONS

Ledbat Status Pages, printed from http://tools.ietf.org/wg/ledbat/charters, 2014, 2 pages.

Ramakrishnan et al. "The Addition of Explicit Congestion Notification (ECN) to IP" Network Working Group, Request for Comments: 3168, 2001, 63 pages.

* cited by examiner

MANAGING COMMUNICATIONS WITHIN A WIRELESS COMMUNICATIONS NETWORK

CROSS REFERENCE TO RELATED APPLICATION(S)

This application is a 35 U.S.C. §371 National Phase Entry Application from PCT/EP2011/060361, filed Jun. 21, 2011, designating the United States, the disclosure of which is incorporated herein in its entirety by reference.

TECHNICAL FIELD

The present application relates to a wireless communications network, a method in a wireless communications network, a method in a gateway of a wireless communications network, and a computer-readable medium.

BACKGROUND

There are a variety of ways to manage congestion in a communications network. Typically, a bitrate cap is applied to each connection to limit the amount of network bandwidth that any one device can occupy. A simple bitrate cap can work fairly well in wire line communications networks where it can be expected that the available bitrate in the "last mile" will remain constant. This holds well in wire line technologies such as DSL or fiber optics. The bitrate cap can be introduced either in the endpoint (modem) or in the access point (Digital Subscriber Line Access Multiplexer). The benefit with a bitrate cap for each device is that bitrate beyond the point at which all the connections are aggregated is strictly bounded, being limited to N×bitrate_cap, where N is the number of devices and bitrate_cap is the uplink bitrate cap.

However, numerous other methods are proposed or being implemented in wire line communications networks.

Low Extra Delay Background Transport (LEDBAT) is a working group of the IETF with the goal to standardize a congestion control for applications that wish to grab as much available bandwidth as possible but release it quickly as soon as congestion occurs. The LEDBAT working group charter is available at http://tools.ietf.org/wg/ledbat/charters. The traffic class associated to this behavior is often termed "less than best effort". LEDBAT may be used for background upload and/or download services or with peer-to-peer technology. The LEDBAT method is already today implemented in peer to peer networks such as uTorrent. Flows that employ the LEDBAT congestion control mechanism may run with very high bitrates when the network is unloaded and will thus be able to complete, say, a file transfer much faster. This allows for efficient communication during periods of low network activity. However, a bitrate cap limitation can defeat the purpose and significantly reduce the effectiveness of the LEDBAT method.

The Congestion Exposure (ConEx) working group of the IETF has a charter, available at http://tools.ietf.org/wg/conex/charters, which states the aim of the working group is to develop a mechanism by which senders inform the network about the congestion encountered by previous packets on the same flow. The network may signal congestion by ECN (explicit congestion notification) markings or by dropping packets, and the receiver passes this information back to the sender in transport-layer acknowledgements. The mechanism to be developed by the ConEx working group will enable the sender to also relay the congestion information back into the network in-band at the IP layer, such that the total level of congestion is visible to all IP devices along the path. The purpose of this is to ensure that any single device doesn't cause too much congestion either on purpose (abuse) or by accident (Denial of Service attack). A problem with implementing the ConEx proposal is that it requires modification to every node within a network, which makes it a very difficult upgrade to apply to existing networks.

RFC3168 "The Addition of Explicit Congestion Notification (ECN) to IP" describes how ECNs may be applied to IP communications. This document specifies the incorporation of ECN (Explicit Congestion Notification) to TCP and IP, including ECN's use of two bits in the IP header. This document specifies that the Internet provide a congestion indication for incipient congestion where the notification can sometimes be through marking packets rather than dropping them (as is standard practice in TCP). This uses an ECN field in the IP header with two bits, making four ECN codepoints, '00' to '11'. The ECN-Capable Transport (ECT) codepoints '10' and '01' are set by the data sender to indicate that the end-points of the transport protocol are ECN-capable.

In wireless communications networks, uplink congestion is typically managed by implementing an uplink bitrate cap per device to ensure that individual devices don't use too much of the finite uplink capacity. An uplink bitrate cap will typically be enforced by measuring the uplink bitrate and introducing packet drops if the uplink bitrate exceeds the bitrate cap. However, when a bitrate cap such as this is applied to a wireless network, the assumption of constant bitrate over the 'last mile' no longer holds. Typically the wireless communications devices are located at different distances from the base station and the laws of physics dictate that devices that are closer to the base station are able to get higher uplink bitrates than devices further away. This is because the output power of the transmitter in wireless communications devices is limited.

FIG. 1 shows a wireless communications system which allows a plurality of wireless communications devices 100 to communicate with the internet 150 via a wireless communications network 105 comprising a base station 110 and additional network equipment 120. Base station 110 includes a processor 111, which is arranged to perform the functions required to manage and conduct wireless communications with the wireless communications devices 100. Base station 110 creates at least one cell of the wireless communications network 105. The wireless communications network 105 includes an uplink scheduler 115, which schedules the transmissions of wireless communications devices 100. As illustrated in FIG. 1, some wireless communications devices 100 are situated very close to base station 110, and some are situated comparably further away.

As wireless communications devices 100 move around, the average expected bitrate in the uplink for each device is limited by:

$$average\_bitrate = total\_max\_ul\_bitrate / N$$

where N is the number of devices and "total_max_ul_bitrate" is the total maximum uplink bitrate for the cell. This assumption holds true for averages taken over medium term timescales (minutes and hours, as devices are moved around within the network over such a timescale), but does not hold true for averages taken over shorter timescales (seconds). Devices 100 that are far away from the base station 110 are unlikely to be able to reach the average bitrate while devices that are close to the base station can obtain bitrates well beyond the average bitrate.

A simple bitrate cap applied in this scenario does not account for the fact that a far away device can make much noise with little gain. A simple analogy is a person trying to hold a conversation in a crowded room with another person 10 m away. Further, such a simple bitrate cap unnecessarily limits the uplink bitrate for some devices. A device that is close to the base station could utilize the extra bitrate to complete an upload faster (with a very limited cost in terms of resource usage) and therefore leave room for others when the upload is complete. This is not possible with a bitrate cap in place.

For the bitrate cap control mechanism to be removed from a wireless communications network, an alternative mechanism to prevent abuse must be provided. Accordingly, there is a need for an improved mechanism for managing communications within a wireless communications network.

SUMMARY

As described above, employing an uplink bitrate cap as a control mechanism in a wireless communications network is sub-optimal. However, it should be noted that a single device using a disproportionate amount of the wireless communications network bandwidth is not in itself undesired. Only when such a device prevents other devices from communicating using the wireless communications network is such disproportionate resource consumption undesired.

The inventor has recognized that an alternative control mechanism in a wireless communications network can be provided by controlling the congestion caused by each device communicating using the network.

Accordingly, there is provided a wireless communications network for communicating with wireless communications devices. The wireless communications network comprises a processor. The processor is arranged to measure congestion for each wireless communication link between a plurality of the wireless communications devices and the wireless communications network. The processor is further arranged to prioritize scheduling of communications with the plurality of wireless communications devices dependent upon the measured congestion.

The prioritization of scheduling may be performed by applying an additional weighting factor to a calculated scheduling weight, the additional weighting factor dependent on the measured congestion. Alternatively, the calculated scheduling weight may be calculated incorporating a factor dependent upon the measured congestion. The congestion may be measured for each radio bearer.

The congestion of communications with a wireless communications device may be measured by: measuring the number of dropped packets; and/or measuring the number of packets marked congestion experienced. The packets may be marked according to Explicit Congestion Notification marking. The measuring is performed for packets communicated for the particular wireless communications device.

The wireless communications network may further comprise an uplink scheduler. The uplink scheduler may be arranged to schedule communications with a plurality of the wireless communications devices according to a weighting function. The weighting function may be dependent upon: the measured congestion; and/or the time elapsed since each wireless communications device was last scheduled; and/or the priority of each wireless communications device; and/or the priority of the information each wireless communications device has to communicate. The scheduling priority of a wireless communications device may be reduced if the measured congestion for its communications exceeds a threshold.

The processor may be in a base station of the wireless communications network. Alternatively, the processor may be in a gateway of the wireless communications network.

There is further provided a method, in a wireless communications network arranged to communicate with a plurality of wireless communications devices. The method comprises measuring a congestion rate for communications with a plurality of the wireless communications device. The method further comprises prioritizing scheduling of communications with the wireless communications devices dependent upon the measured congestion rate. The method may be performed in a base station. The base station may be an eNode B of an LTE network.

There is further provided a method in a gateway of a wireless communications network, the wireless communications network arranged to communicate with a plurality of wireless communications devices. The method comprises receiving a measurement of congestion for communications with a plurality of the wireless communications devices. The method further comprises sending a scheduling weight modifier for at least one wireless communications device, the scheduling weight modifier dependent upon the measured congestion rate. The gateway may be a Packet Data Network Gateway (PDN-GW) of an LTE network. A base station may send measures of congestion to the gateway. The gateway may send a schedule weight modifier to the base station.

There is further provided a computer-readable medium, carrying instructions, which, when executed by computer logic, causes said computer logic to carry out any of the methods defined herein.

BRIEF DESCRIPTION OF THE DRAWINGS

An improved mechanism for managing communications within a wireless communications network will now be described, by way of example only, with reference to the accompanying drawings, in which:

FIG. 6b shows the congestion scaling factor calculated for the flow of FIG. 6a;

DETAILED DESCRIPTION

In an uplink scheduler of a wireless communications network, devices are scheduled to communicate in the uplink (transmit) according to a function which provides a scheduling weight for each device. This scheduling weight may be determined by numerous factors dependent on the particular network implementation. Examples of such factors include: time since device is last scheduled, the priority of the device, and the priority of the information the device wishes to communicate. The method disclosed herein provides a new factor which is considered when the schedule weight for the devices is calculated.

Two embodiments will be described. The first will address how the disclosed mechanism is implemented in a base station of a wireless communications network, using the specific example of an eNodeB of an LTE network. An optional extension is described in the second embodiment which maintains a record of the congestion information for a device during a handover from one base station to another.

There follows a brief discussion of the terminology used in this document. MARKING: this is exemplified by ECN-CE marking, i.e. the two ECN bits in the IP header are set to "11" to show congestion experienced. ECN-CE marking is only allowed if the packet is ECN Capable (ECT). CONGESTION: a network or an interface reaches a state of congestion when the delay through that node starts to increase rapidly, occasionally congestion may lead to packet drops. EXCESSIVE CONGESTION: a state when the delay and jitter takes extreme values, also packet losses become common. CONGESTION VOLUME: the volume of the packets that are marked or dropped. This is calculated as the accumulated size of all marked packets, this can be put in relation to the total traffic volume, the congestion volume is then expressed as a percentage. Congestion volume can be calculated per flow, per device, or per aggregator of flows (i.e. per multiplexer) etc. Moreover, the congestion volume can be calculated per time interval, as an accumulated metric, or over a sliding time window.

Figure 1:
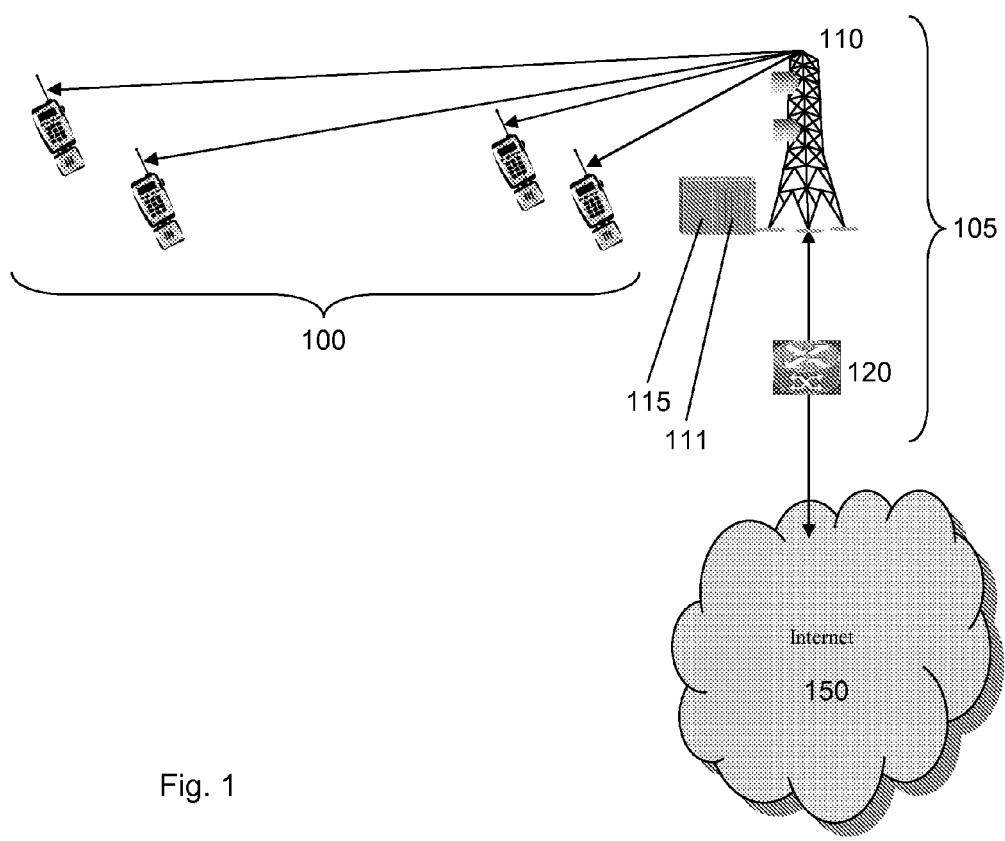
FIG. 1 illustrates a wireless communications system.
Figure 2:
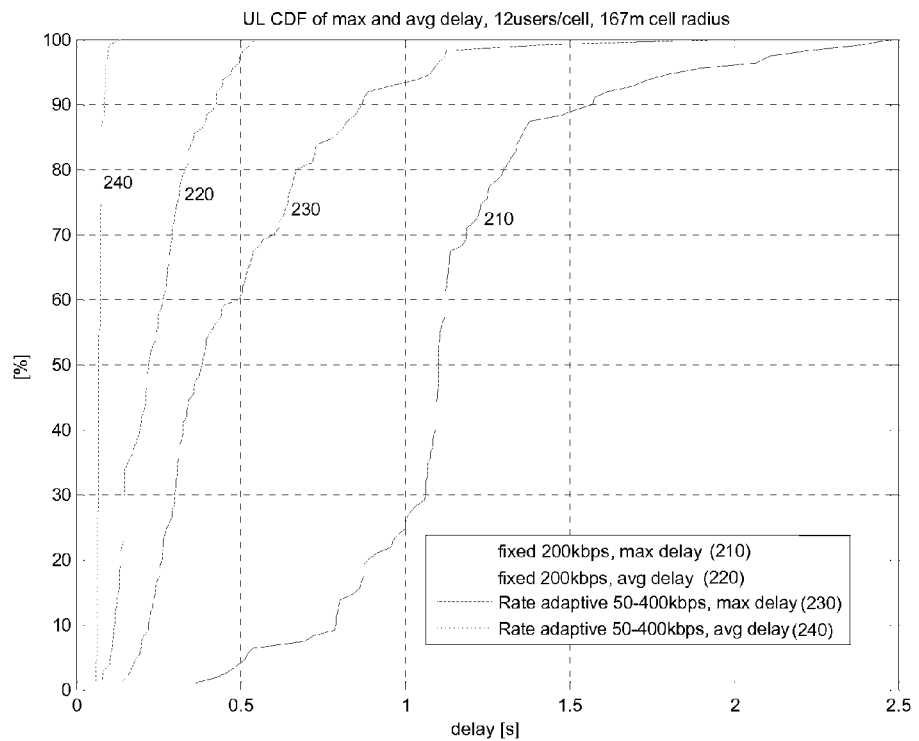
FIG. 2 is a graph showing both the maximum and average delay for both a fixed bitrate setting and an adaptive bitrate setting.

To illustrate the problems with bitrate caps in a wireless communications network, a simple simulation of uplink traffic in an LTE network was performed. The simulation featured 110 devices located in 9 cells with 167 m cell radius. A UDP (user datagram protocol) sender was run with two alternative settings. The first setting had all devices running at a fixed bitrate whereby the device stuck to the same bitrate of 200 kbps despite any congestion notifications. The second setting had all devices vary the bitrate they used between 50 and 400 kbps depending on congestion. FIG. 2 is a graph showing both the maximum and average delay with respect to these two settings. For the first setting with a fixed bitrate, the max delay is shown by curve 210, and the average delay by line 220. For the second setting with variable bitrate, the max delay is shown by curve 230 and the average delay by curve 240.

This simulation clearly shows that bitrate adaptation gives a considerably better performance than the case where all devices run with a fixed bitrate cap. A device running with fixed bitrate not only suffers from excessive delay and packet loss itself, but other devices using the wireless communications network are also impacted in a negative way by the congestion it causes. It is worth mention that the total average bitrate for all devices is slightly higher when the devices use an adaptive bitrate. This is because the adaptive bitrate gives increased total goodput. The result from this simulation shows that a bitrate limitation in the uplink does not guarantee good service for all devices, and further that congestion is a much better control metric.

Uplink congestion can be monitored in a number of ways based on different features in the uplink schedulers. Once detected, congestion can be indicated by either an ECN-CE mark applied to packets that are ECT, or by dropping packets that are not-ECT. Other congestion indicators may be used. The congestion is indicated in this way to signal to the affected devices that they should reduce the bitrate they are using. The fraction of packets that are either marked or dropped this way is given the term mark rate. The mark rate is counted on a sliding window basis over the last K packets, and is expressed as a percentage. The mark rate is calculated as:

mark_rate=number_of_marked_packets/number_of_packets.

Protocols that have an elastic behavior (TCP, SCTP, DCCP) react to these signals of congestion and correspondingly reduce their bitrate within one round-trip time. Other protocols, for instance TFRC for RTP/UDP may take a longer time to react as they average packet loss or ECN statistics over a plurality of the last round-trip time intervals, typically over the last 8. So, in practice protocols that react to congestion signals do so over a fairly short time scale, and typically within 2 seconds.

This property can be exploited to enforce actions on devices/flows that do not react to signals of congestion properly. The users/devices may behave in one of three ways:
1. No reaction at all (these are bandwidth hogs)
2. Too little reaction (rate is not sufficiently decreased)
3. Too slow reaction (rate is decreased too slowly)

The mark rate itself has no relation to the packet size or bitrate, and so it is more appropriate to use congestion volume, as described above. The congestion volume has the property that bandwidth hogs are more likely to cause it to take a high value than a typical device, one for instance being used by a casual websurfer. Accordingly, the congestion volume is calculated for each device. This may be done in many different ways; a simple method is to use a long sliding window over several seconds and compute the aggregate size of congested packets (those that are either marked ECN-CE or those that are dropped) over that time span. Congestion volume can be measured in kbits or kbits/s.

As described above, the uplink scheduler of a wireless communications network schedules devices to transmit according to a function which provides a scheduling weight for each device. The method disclosed herein adds the extra information provided by the calculated congestion volume to the weighting function. The purpose of the congestion volume is to gradually reduce the scheduling weight of a device if the congestion volume exceeds a threshold. One way to achieve this is to calculate the scheduling weight taking into account the congestion volume. Another way to do this is to apply a congestion scaling factor to the "regular" scheduling weight (calculated in the normal way) to generate a modified scheduling weight.

modified_scheduling_weight=regular_scheduling_weight× congestion_scaling_factor

Figure 3:
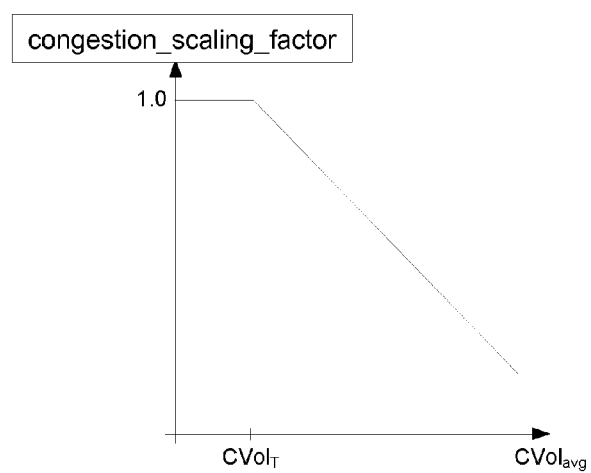
FIG. 3 illustrates the relationship between the congestion scaling factor and the congestion volume cVol.

The relationship between the congestion scaling factor and the congestion volume cVol is illustrated in FIG. 3. FIG. 3 shows a congestion scaling factor of 1 for values of congestion volume less than or equal to a threshold value $cVol_T$. For congestion volumes greater than the threshold value the congestion scaling factor decreases linearly with increasing congestion volume. In other embodiments non-linear decreases in congestion scaling factor with increasing congestion volume may be implemented. A typical threshold value, $cVol_T$, would be 10 kbps.

The effect of such a scheduling weight based on congestion volume is that devices that run applications that react responsibly to congestion remain unfettered, and their scheduling weight is decided according to the normal priorities. However, devices that run applications that do not act responsibly get a quality of service that is inversely proportional to how badly they manage their congestion. Typically, the scheduling weight dependence on the congestion volume is tuned such that transport protocols that act TCP friendly within the timescale of a few round-trip times are not affected.

Figure 4:
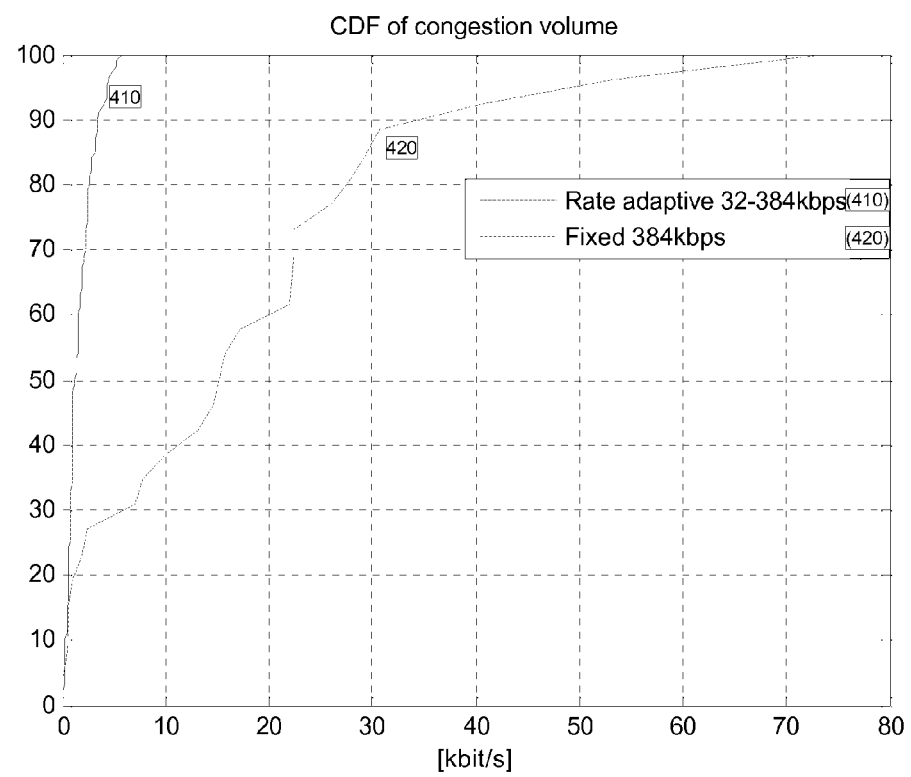
FIG. 4 illustrates congestion volume for a plurality of devices, each running a video stream in the uplink.

FIG. 4 also illustrates congestion volume but for a plurality of devices, each running a video stream in the uplink. The simulation giving rise to FIG. 4 has 126 devices covering a deployment of 7 base stations each with 3 sectors. The simulation time is 200 seconds. In this simulation, 80% of the devices run video codecs that respond properly to congestion indications (either ECN-CE or packet drops). The remaining 20% may be thought of as misbehaving devices; these don't respond to congestion and run at 384 kbps regardless of the channel conditions.

Curve 410 of FIG. 4 shows the congestion volume of all of the devices with bitrate adaptive codecs having a congestion volume of less than 5 kbit/s. Curve 420 shows the congestion volume of the misbehaving devices, where some 60% of these have a congestion volume over 10 kbit/s. The scheduler weighting can be tuned to address such a situation such that it reduces the scheduling weight gradually as soon as the congestion volume exceeds $cVol_T=5$ kbps (as indicated in FIG. 3), this makes it is possible to penalize the misbehaving flows without noticeably affecting the behaving flows. This incentivizes a proper reaction to congestion and will in the end give all users an optimal performance.

There is a potential for unwanted feedback whereby a device which receives a reduced scheduling weight continues to attempt to communicate at a high bitrate, meaning that even less of its traffic can get through, causing even more congestion and thus an even lower scheduling weight. This may be avoided if the calculation of congestion volume (cVol) accounts for this by using an ECN marking regime that is based on the cost of system resources per successfully transmitted bit. (Cost per transmitted bit for downlink transmission can be measured as power per bit. In practice one computes how many watts are needed to transmit a transport block in one transmission time interval for a given device, and then packets are ECN-CE marked if this metric exceeds a given value. Cost per transmitted bit in the uplink direction is more complicated, and may be measured as resource blocks per bit.)

Of course, some kinds of device traffic have a guaranteed minimum bitrate. An example of this is VoIP (Voice over IP) which is guaranteed a minimum bitrate sufficient to provide an acceptable quality of service to the device and its user. The method described above uses a measure of congestion to determine the scheduling priority. In an optional extension of that method, whether or not there is a guaranteed minimum bitrate and the value of that guaranteed minimum bitrate are factors that are also considered when determining the scheduling weight for a device. A device using radio bearers having a guaranteed minimum bitrate is given a higher scheduling priority than another device that has no bearers with guaranteed minimum bitrate, all other factors being equal. Giving devices which are using guaranteed minimum bitrate bearers a higher priority assumes that the flow of that bearer does react responsibly to congestion and so has reduced its bitrate to the minimum bitrate. As a further optional extension, a bitrate computation algorithm is implemented to verify that the flow in respect of devices using guaranteed minimum bitrate bearers do run at the minimum bitrate when congestion is experienced. If the bitrate computation algorithm identifies a device using guaranteed minimum bitrate bearers but not running at the minimum bitrate, the scheduling priority for the device is reduced. Further, the device may be treated as though it was not using guaranteed minimum bitrate bearers.

Figure 5:
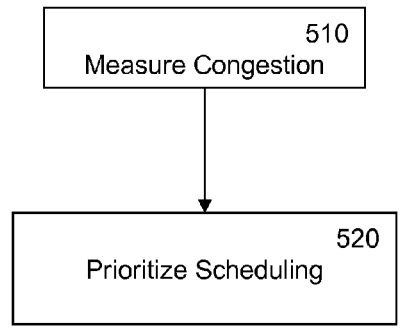
FIG. 5 illustrates the method of a first embodiment.

FIG. 5 illustrates the method of this first embodiment. This method is performed in the wireless communications network, and may be performed at a base station of the wireless communications network. At 510 the congestion for each of a plurality of devices connected to the wireless communications network is measured. At 520 the scheduling of the communications for each of these devices is prioritized, with devices having the measured congestion above a threshold value given a decreased scheduling priority.

A benefit of the above described first embodiment is that it does not require modifications to other parts of the network as the method can be performed solely within the base station (eNodeB in an LTE wireless communications network). A drawback of the first embodiment is that at cell handover the congestion state is not easily transferred from the originating cell to the target cell. This means that a new state must be setup for each handover. This is illustrated in FIGS. 6*a* and 6*b*.

Figure 6A:
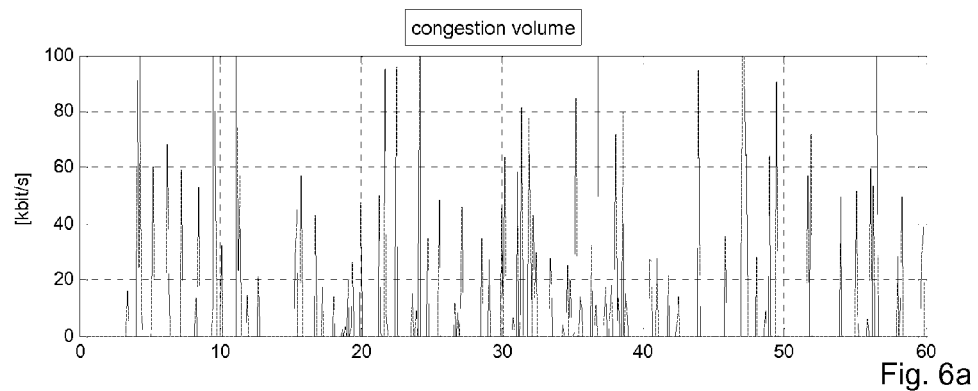
FIG. 6a shows congestion volume, in kbit/s, for an individual misbehaving flow of a device experiencing a plurality of cell handovers.
Figure 6B:
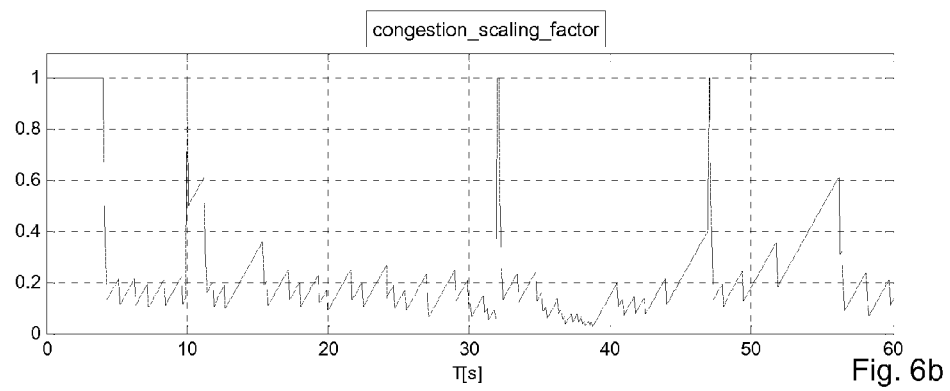

FIG. 6*a* shows congestion volume, in kbit/s, for an individual misbehaving flow operating in a system according to the first embodiment. FIG. 6*b* shows the congestion scaling factor, a ratio, calculated for the flow of FIG. 6*a*. The sharp rises from low congestion scaling factor back up to 1.0 (shown at t=10, t=32 and t=47 seconds) are because the device makes a handover from one cell to another cell, where there is no means to keep track of the congestion volume or congestion scaling factor during handover.

The second embodiment provides an optional extension to the first embodiment with an aim to address the problem of the above described congestion dependent scheduling priority being reset upon cell handover. In the second embodiment, the anchor point involved in the scheduling weight scaling decision for a flow is moved from the base station to a gateway within the wireless communications network. In an LTE wireless communications network, the anchor point is the Packet Data Network Gateway (PDN-GW). In alternative embodiments the anchor point is another network node such as a Serving Gateway (S-GW).

In this embodiment, the policing function is maintained in the PDN-GW and additional lightweight signaling (in this case over a GPRS Tunneling Protocol such as GTP-U) is added to allow the PDN-GW to instruct the eNodeB to penalize misbehaving flows.

Figure 7:
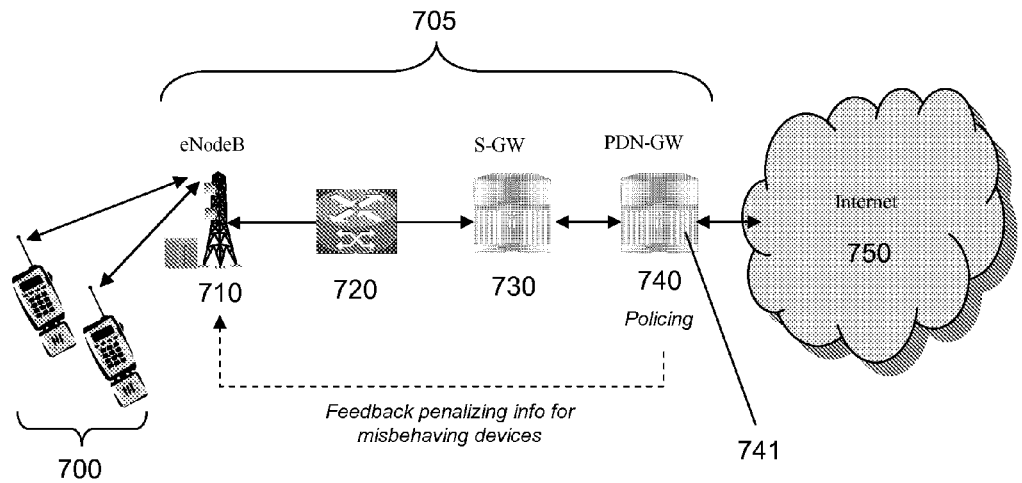
FIG. 7 illustrates the structure of a wireless communications network incorporating a second embodiment.

The structure of a wireless communications network incorporating this second embodiment is illustrated in FIG. 7. For clarity, the structure of this network is described in the context of an LTE network 705. A plurality of wireless communications devices 700 communicate with an eNodeB 710. Additional network equipment is figuratively illustrated by 720. eNode B 710 communicates via the additional network equipment 720 with a serving gateway S-GW 730, which in turn communicates with a PDN-GW 740. PDN-GW 740 includes a processor 741, which is arranged to perform the functions required to manage and conduct its communications over the wireless communications network 705. The policing function of this embodiment is incorporated into the PDN-GW 740 of an LTE network 705. PDN-GW 740 in turn connects the communication network 705 to the internet 750. In operation, the PDN-GW 740 receives or infers information regarding the radio bearers in use for communications between the eNodeB 710 and the wireless communications devices 700, and the PDN-GW 740 sends feedback regarding scheduling prioritization to the eNodeB 710.

There is a GPRS Tunneling Protocol (GTP) tunneled path between eNodeB 710 and PDN-GW 740; this may be ECN capable. Moreover, the flows between the communicating endpoints, here originating in the wireless communications devices 700, may also be ECN capable. The PDN-GW 740 will thus get the following information for each radio bearer.

1. Total number of packets received
2. Total number of packets dropped
3. Total number of ECN-CE marked packets along the path between the eNodeB 710 and the PDN-GW 740
4. Total number of ECN-CE marked packets in eNodeB 710.

The optional sequence number is enabled in the GTP-U (GTP User Plane) tunnel, such that all of the above information can be inferred from the flow of uplink packets in the PDN-GW 740. In addition to the above, failed transmission attempts, detected at the RLC layer in eNodeB 710, are reported to the PDN-GW 740 to allow these to be accounted for as well. In addition, for monitoring purposes, the amount of ECN-CE marking already detected in the eNodeB 710 may be reported to the PDN-GW 740.

To facilitate the above described reporting functionality, an extra GTP-U header extension is added to the uplink flow (from eNodeB 710 to PDN-GW 740) with the following information elements.
1. Total number of packet drops detected at the RLC layer
2. Total number of ECN-CE marked packets detected in eNodeB
3. Cell identifier Note that the packets may have been ECN marked already in the UE.

The cell identifier is needed in order to support handover because the counters for packet drops and ECN-CE need to be reset at cell handover. The cell identifier also helps the PDN-GW 740 to calculate correct statistics. Note that this information is also useful for monitoring purposes (detection of highly loaded cells, and load balancing).

A complicating issue is that packets may have been dropped already in the uplink sending queue in the device, and this would not be detected with the above method. This is however not a big concern for a wireless communications network as no radio resources have been used on these packets.

The additional GTP-U header extension is not added to every GTP-U packet, this to limit the additional overhead, the timing is not extremely critical so a report rate of 1 report per second may be sufficient.

Based on the received information about each flow (or bearer, or device) the PDN-GW 740 can determine the congestion volume for each flow, compare it to the service level agreement and impose a penalty action on flows that cause a higher congestion volume than allowed. This has the advantage that misbehaving devices are not able to steal a disproportionate amount of the wireless communication network's resources. An additional GTP-U header extension is used to signal from the PDN-GW 740 to the eNodeB 710 that a misbehaving device should be penalized. Such a penalty is implemented by reducing the scheduling priority as explained above.

Figure 8:
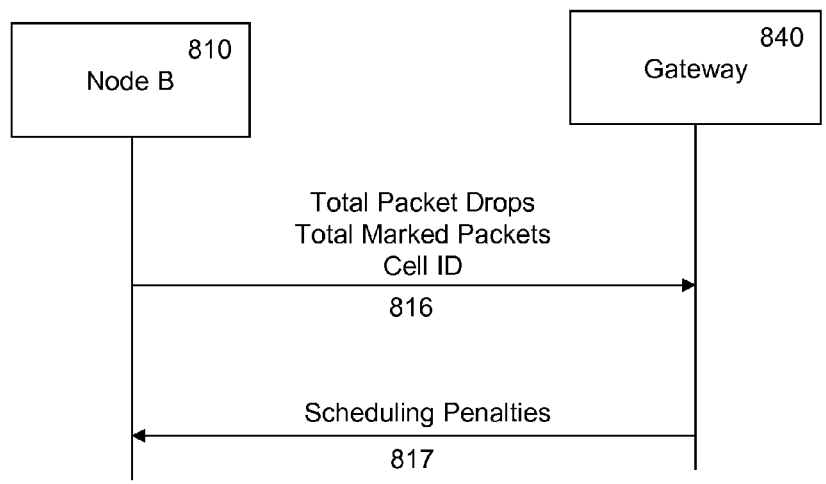
FIG. 8 shows a signaling diagram between a Node B and a gateway.

The above information flow is illustrated in the signaling diagram of FIG. 8. A Node B 810 sends a message 816 to a gateway 840. The message 816 comprises: the total number of packet drops detected at the RLC layer; the total number of ECN-CE marked packets detected in the Node B 810; and a cell identifier. The gateway 840 provides a policing function and in response to the information received from the Node B 810, sends a message 817 to the Node B 810. The message 817 includes any scheduling penalties that should be applied to the devices communicating via Node B 810.

The following benefits are provided by the method of this second embodiment as compared to that of the first embodiment (where the policing is done solely in the base station). The state for each device and radio bearer is maintained despite handover. The gathered information can be used for monitoring purposes. The information can be used in Macro/Pico base station load balancing. Besides the penalizing in the form of lower priority in the eNodeB, additional policing of uplink traffic can be performed in the PDN-GW.

A further modification of the method disclosed herein is to use the congestion volume information to terminate radio bearers for persistently misbehaving devices.

The methods and apparatus disclosed herein introduce a mechanism that makes it possible for devices to fully use the available bandwidth in the wireless uplink and at the same time ensure that devices don't abuse this.

It will be apparent to the skilled person that the exact order and content of the actions carried out in the methods described herein may be altered according to the requirements of a particular set of execution parameters. Accordingly, the order in which actions are described and/or claimed is not to be construed as a strict limitation on order in which actions are to be performed.

Further, while examples have been given in the context of particular communications standards, these examples are not intended to be the limit of the communications standards to which the disclosed method and apparatus may be applied. For example, while specific examples have been given in the context of LTE, the principles disclosed herein can also be applied to a WCDMA system, other wireless communication system, and indeed any wireless communication system which allows the monitoring of congestion for devices connected to it.

The invention claimed is:

1. A wireless communications network for communicating with wireless communications devices using wireless communication links, the wireless communications network comprising:
   a base station having a processor configured to:
      measure congestion for each wireless communication link between a plurality of the wireless communications devices and the wireless communications network,
      prioritize scheduling of communications with the plurality of wireless communications devices dependent upon the measured congestion, and
      send a scheduling weight modifier for at least one wireless communications device, the scheduling weight modifier dependent upon the measured congestion.

2. The wireless communications network of claim 1, wherein the congestion of communications with a wireless communications device is measured by at least one of:
   measuring the number of dropped packets; and
   measuring the number of packets marked congestion experienced.

3. The wireless communications network of claim 1, wherein the wireless communications network further comprises an uplink scheduler, the uplink scheduler configured to schedule communications with a plurality of the wireless communications devices according to the scheduling weight modifier.

4. The wireless communications network of claim 3, wherein the weighting function is dependent upon the measured congestion and at least one of:
   the time elapsed since each wireless communications device was last scheduled;
   the priority of each wireless communications device; and
   the priority of the information each wireless communications device has to communicate.

5. The wireless communications network of claim 1, wherein the scheduling priority of a wireless communications device is reduced if the measured congestion for its communications exceeds a threshold.

6. A method, performed in a base station in a wireless communications network configured to communicate with a plurality of wireless communications devices, the method comprising:
- measuring, by the base station, a congestion rate for communications with a plurality of the wireless communications device; and
- prioritizing, by the base station, scheduling of communications with the wireless communications devices dependent upon the measured congestion rate; and
- sending, by the base station, a scheduling weight modifier for at least one wireless communication device, the scheduling weight modifier dependent upon the measured congestion rate.

7. A method in a gateway of a wireless communications network, the wireless communications network configured to communicate with a plurality of wireless communications devices, the method comprising:
- receiving, by the gateway, a measurement of congestion for communications with a plurality of the wireless communications devices; and
- sending, by the gateway, a scheduling weight modifier for at least one wireless communications device, the scheduling weight modifier dependent upon the measured congestion.

8. The method of claim 7, wherein:
- a base station sends measures of congestion to the gateway; and
- the gateway sends a schedule weight modifier to the base station.

9. A non-transitory computer-readable medium, carrying instructions, which, when executed by computer logic, causes said computer logic to carry out the method of claim 6.

10. The wireless communications network of claim 1, wherein the scheduling weight modifier is a product of a regular scheduling weight and a congestion scaling factor.

11. The method of claim 6, wherein the congestion value is based on an electronic communication network (ECN) marking regime that is based on a cost of system resources per successfully transmitted bit.

* * * * *